United States Patent [19]
Terashi et al.

[11] Patent Number: 5,795,502
[45] Date of Patent: Aug. 18, 1998

[54] ELECTRICALLY CONDUCTING CERAMICS, PROCESS FOR PRODUCING THE SAME AND FUEL CELL USING THE CERAMICS

[75] Inventors: Yoshitake Terashi; Takashi Shigehisa; Masahide Akiyama; Shoji Yamashita, all of Kokubu, Japan

[73] Assignee: Kyocera Corporation, Kyoto, Japan

[21] Appl. No.: 650,976

[22] Filed: May 21, 1996

[30] Foreign Application Priority Data

Dec. 13, 1995 [JP] Japan .................... 7-324687

[51] Int. Cl.$^6$ .................... H01B 1/08; H01M 8/10
[52] U.S. Cl. .................... 252/521.1; 429/32; 252/519.1
[58] Field of Search .................... 252/518, 521, 252/519.1, 521.1; 423/21.1, 155, 263, 593, 635, 636; 429/12, 31, 32, 209, 245; 501/117

[56] References Cited

U.S. PATENT DOCUMENTS

| 5,185,301 | 2/1993 | Li et al. .................... 501/117 |
| 5,478,444 | 12/1995 | Liu et al. .................... 204/59 R |

FOREIGN PATENT DOCUMENTS

| 7237967 | 9/1995 | Japan . |
| 8091922 | 4/1996 | Japan . |
| 8119738 | 5/1996 | Japan . |

*Primary Examiner*—Mark Kopec
*Attorney, Agent, or Firm*—Loeb & Loeb LLP

[57] ABSTRACT

Electrically conducting ceramics having, as a chief crystalline phase, a perovskite crystalline phase containing La, Cr and Mg and further having, in addition to the chief crystalline phase, an oxide phase containing La, wherein when the atomic ratios among the rare earth element, Mg and Cr in said chief crystalline phase are represented by the following formula, $$R:Mg:Cr = x:y:z$$

wherein R denotes rare earth elements at least part of which being La, the atomic ratios among the rare earth element, Mg and Cr contained in the whole ceramics are represented by the following formula, $$R:Mg:Cr = (x+u):(y+v):z$$

wherein R, x to z are as defined above, and u and v are the numbers satisfying the following formulas, $$0.0001 \leq u/(x+y+z) \leq 0.20,$$

$$0.01 \leq (y+v)/(x+y+z) \leq 0.60, \text{ and } 0 \leq v.$$

The ceramics is dense, exhibits excellent sintering property at low temperatures, has high electric conductivity, and remains stable in a reducing atmosphere.

13 Claims, 2 Drawing Sheets

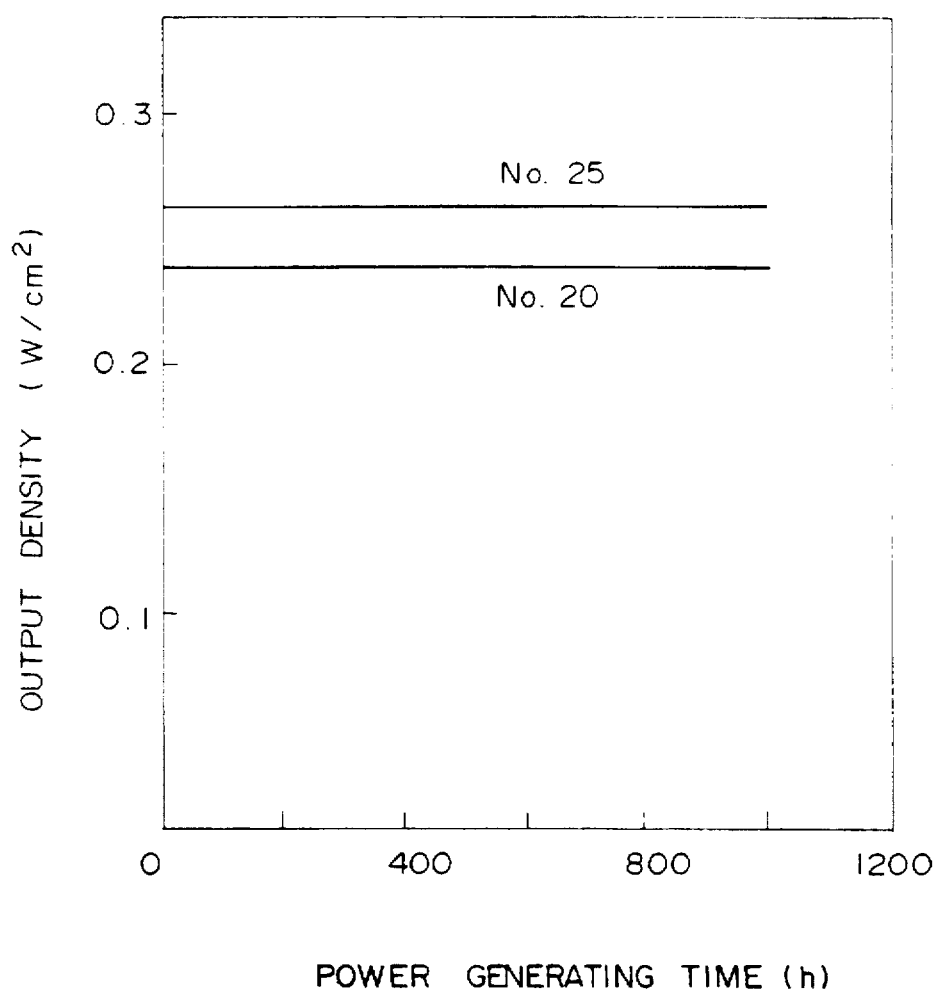
F I G. 3

5,795,502

ELECTRICALLY CONDUCTING CERAMICS, PROCESS FOR PRODUCING THE SAME AND FUEL CELL USING THE CERAMICS

BACKGROUND OF THE INVENTION

1. Field of the Invention

The present invention relates to electrically conducting ceramics having, as a chief component, a perovskite crystalline phase which contains La, Cr and Mg. More specifically, the invention relates to electrically conducting ceramics that exhibits improved sintering property and can be effectively used as a separator in a fuel cell, as a collector member such as interconnector as a gas diffuser, and as a collector member for MHD power generation.

2. Description of the Prior Art

A lanthanum-chromite oxide ($LaCrO_3$) having a perovskite crystalline structure remains chemically very stable at high temperatures and exhibits large electron conducting property, and its sintered product has been used as a variety of members for fuel cells, such as separator, gas diffuser and collector members like interconnector, etc.

However, the lanthanum-chromite oxide has defects in that cations diffuse at a low rate and that Cr component vaporizes predominantly in the step of sintering. That is, Cr component that has vaporized coagulates and deposits as $Cr_2O_3$ on the contacting portions (neck) of particles to impair the sintering. Therefore, the lanthanum-chromite oxide is sintered in the open air at a high temperature of not lower than 2000° C. Vaporization and coagulation of Cr can be suppressed by effecting the sintering in a reducing atmosphere. Even in this case, however, a temperature of not lower than 1800° C. is necessary. The sintering at such high temperatures is economically very disadvantageous. Therefore, it is difficult to mass-produce fuel cells having constituent members composed of, for example, lanthanum-chromite oxide, or the production becomes costly if not possible.

A method of obtaining sintered product of lanthanum-chromite oxide at low temperatures can be represented by an electrochemical vapor deposition (EVD) method. According to this method, the synthesizing is effected at a relatively low temperature range of about 1400° C. enabling, however, $LaCrO_3$ to grow at a low rate. Therefore, this method is not suited for the mass-production and, besides, involves an economical problem since it must use a very expensive metal salt compound as a starting material.

SUMMARY OF THE INVENTION

The present inventors have forwarded the study to solve problems inherent in the electrically conducting ceramics produced from the above-mentioned lanthanum-chromite oxide, have discovered the fact that the lanthanum-chromite oxide containing magnesium that is sintered at a low temperature being mixed with powders of oxides of rare earth elements such as lanthanum and powders of oxides of alkaline earth metals makes it possible to obtain electrically conducting ceramics having improved sintering property, dense structure and excellent properties such as electrically conducting property and the like properties, and have thus accomplished the present invention.

That is, the object of the present invention is to provide electrically conducting ceramics having favorable properties such as electrically conducting property and like properties at a reduced cost by improving sintering property of the lanthanum-chromite oxide at low temperatures.

Another object of the present invention is to provide electrically conducting ceramics that is suited for use as collector members for fuel cells.

According to the present invention, there is provided electrically conducting ceramics having, as a chief crystalline phase, a perovskite crystalline phase containing at least one kind of rare earth element, Cr and Mg and further having, in addition to the chief crystalline phase, an oxide phase containing at least one kind of rare earth element, wherein said chief crystalline phase and said oxide phase contain at least La as a rare earth element and when atomic ratios among the rare earth element, Mg and Cr in said chief crystalline phase are represented by the following formula (I), $$R{:}Mg{:}Cr = x{:}y{:}z \qquad (I)$$

wherein R denotes a rare earth element, atomic ratios among the rare earth element, Mg and Cr contained in the whole ceramics are represented by the following formula (II), $$R{:}Mg{:}Cr = (x+u){:}(y+v){:}z \qquad (II)$$

wherein R is as defined above, x, y and z are the numbers as defined in the formula (I) above, and u and v are the numbers satisfying the following formulas, $$0.0001 \leq u/(x+y+z) \leq 0.20 \qquad (a)$$

$$0.01 \leq (y+v)/(x+y+z) \leq 0.60 \qquad (b)$$

$$0 \leq v \qquad (c).$$

According to the present invention, when $v=0$ in the formula (II), it is desired that x, y and z are the numbers satisfying the following formula, $$0.01 \leq y/(x+y+z) \leq 0.20 \qquad (d).$$

When $v>0$, furthermore, it is desired that x, y and z are the numbers satisfying the following formula, $$0.20 < (y+v)/(x+y+z) \leq 0.60 \qquad (e).$$

According to the present invention, furthermore, the above-mentioned electrically conducting ceramics can be prepared by mixing a powder of a perovskite composite oxide containing La, Cr and Mg and a powder of an oxide of a rare earth element, and molding the mixed powder into a predetermined shape followed by firing in an oxidizing atmosphere at 1300° to 1700° C.

According to the present invention, furthermore, there is provided a fuel cell in which collector members for electrically connecting the cells are composed of the above-mentioned electrically conducting ceramics.

BRIEF DESCRIPTION OF THE DRAWINGS

FIG. 2 and FIG. 3 are a diagram illustrating a relationship between the output density and the power generating time in the fuel cells of Examples 6 and 7.

Figure 1:
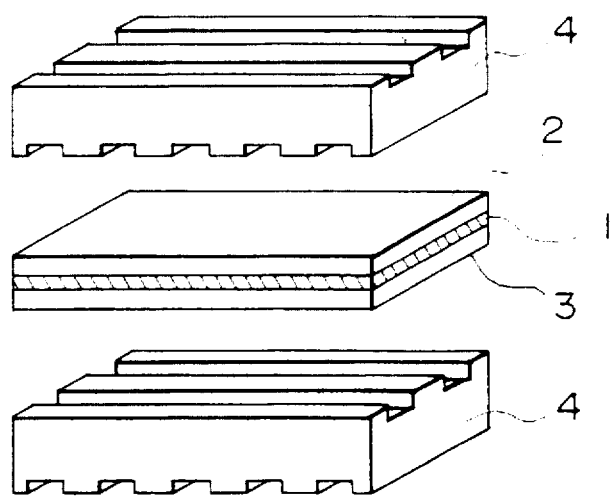
FIG. 1 is a perspective view illustrating, in a disassembled manner, a unit structure in a flat-plate fuel cell.

DETAILED DESCRIPTION OF THE INVENTION (Electrically Conducting Ceramics)

The electrically conducting ceramics of the present invention has, as a chief crystalline phase, a perovskite crystalline phase and an oxide phase containing at least La in addition to the chief crystalline phase.

The perovskite crystals constituting the chief crystalline phase contain a rare earth element, Cr and Mg, and the atomic ratios among them are presented by the above-mentioned formula (I).

$$R:Mg:Cr = x:y:z \quad (I)$$

wherein R is a rare earth element.

Here, as is well known, the perovskite crystals have a crystalline structure of the $ABO_3$-type and, ideally, has an A-site constituent element/B-site constituent element (atomic ratio)=1. That is, the rare earth element (R) is an A-site constituent element, and Cr and Mg are B-site constituent elements. Theoretically, therefore, x, y and z satisfy the following formula, $$x = y + z \quad (f)$$

According to the present invention, it is important that Cr is partly substituted by Mg in the perovskite chief crystalline phase. Owing to the presence of Mg, the electrically conducting ceramics of the present invention exhibits very high electrically conducting property. That is, when Cr in $LaCrO_3$ is substituted by Mg, a hole (h·) is formed according to the following formulas (III) and (IV), $$Cr^x{}_{Cr} + MgO + O_2(g) \rightarrow Mg\cdot_{Cr} + Cr\cdot_{Cr} + 3O^x{}_O \quad (III)$$

$$Cr^x{}_{Cr} + h\cdot \rightleftharpoons Cr\cdot_{Cr} \quad (IV)$$

wherein $Cr^x{}_{Cr}$ is a trivalent chromium ion, $O_2(g)$ is an oxygen gas, $Mg\cdot_{Cr}$ is a magnesium ion substituting for a chromium ion, $O^x{}_O$ is an oxygen ion of lattice point, $Cr\cdot_{Cr}$ is a tetravalent chromium ion and h· is a hole.

As will be obvious from the above-mentioned formulas (III) and (IV), the electric conductivity varies in proportion to the concentration of Mg ions substituting for Cr, from which it will be understood that the electrically conducting ceramics of the present invention has a high electrically conducting property.

According to the present invention, furthermore, it is essential that at least La is contained as a rare earth element (R) in the perovskite crystalline phase. That is, with La being contained in the chief crystalline phase, the ceramics exhibits chemical stability and electron conducting property specific to the lanthanum-chromite oxide. Therefore, provided the chemical stability and electron conducting property of the ceramics are not adversely affected, La may be partly substituted with other rare earth element such as yttrium (Y), ytterbium (Yb), cerium (Ce), samarium (Sm), neodium (Nd), erbium (Er), dysprosium (Dy) or the like, or may be substituted by an A-site constituent element such as Ca, Ba or Sr other than the rare earth element. In particular, when La is partly substituted by Ca, Ba or Sr, the electric conductivity is further improved like the case of Mg. That is, for example, when La in $LaCrO_3$ is partly substituted by Ca, hole (h·) is formed according to the following formulas, $$Cr^x{}_{Cr} + CaO + O_2(g) \rightarrow Ca\cdot_{La} + Cr\cdot_{Cr} + 3O^x{}_O$$

$$Cr^x{}_{Cr} + h\cdot \rightleftharpoons Cr\cdot_{Cr}$$

wherein $Cr^x{}_{Cr}$ is a trivalent chromium ion, $O_2(g)$ is an oxygen gas, $Ca\cdot_{La}$ is a calcium ion substituting for La, $O^x{}_O$ is an oxygen ion of lattice point, $Cr\cdot_{Cr}$ is a tetravalent chromium ion and h· is a hole.

As will be obvious from the above formulas, the electric conductivity varies in proportion to the concentration of Ca ions substituting for La, and is improved. When La is partly substituted by other A-site constituent element, x in the above-mentioned formula (I) is determined inclusive of the amount of substitution.

In the above-mentioned perovskite crystalline phase, Cr may be partly substituted by the B-site constituent element such as Mn, Ni, Co or Fe within a range in which properties such as sintering property at low temperatures and electric conductivity are not impaired. In this case, z in the formula (I) represents the atomic ratio inclusive of Cr-substituted atoms. In general, it is desired that Cr is substituted in an amount of not larger than 30 atomic % and, particularly, not larger than 10 atomic %.

The electrically conducting ceramics of the present invention contains the above-mentioned perovskite chief crystalline phase in an amount of, usually, not smaller than 50% by volume and further contains, in addition to the chief crystalline phase, an oxide phase containing at least a rare earth element. That is, the atomic ratios among the rare earth element, Mg and Cr contained in the electrically conducting ceramics of the present invention is represented by the above-mentioned formula (II), i.e., $$R:Mg:Cr = (x+u):(y+v):z \quad (II)$$

wherein R is as defined above, x, y and z are the numbers as defined in the formula (I) above, and u and v are the numbers satisfying the following formulas, $$0.0001 \leq u/(x+y+z) \leq 0.20 \quad (a)$$

$$0.01 \leq (y+v)/(x+y+z) \leq 0.60 \quad (b)$$

$$0 \leq v \quad (c)$$

In the electrically conducting ceramics of the present invention as will be comprehended from the comparison of the formula (II) with the formula (I), Cr substantially exists in the perovskite crystalline phase but does not exist in the oxide phase.

The ceramics further contains the rare earth element (R) in an excess amount that corresponds to (u) with respect to the reference composition of the perovskite crystalline phase, and contains the oxide phase based upon the excess amount of the rare earth element (R). In the present invention, it is important that at least part of the rare earth element (R) in the oxide phase is La. That is, La that exists in the oxide phase separately from the perovskite crystalline phase makes it possible to obtain excellent low-temperature sintering property as disclosed in the Examples that will be mentioned later and, in this connection, the ceramics of the invention has a dense structure with an open porosity of not larger than 0.5% and, particularly, not larger than 0.3%.

As described earlier, when the lanthanum-chromite oxide is fired, Cr vaporizes predominantly and coagulates and deposits on the contacting portions (neck) of the particles. Therefore, the cations are impaired from diffusing and sintering property is deteriorated. According, to the present invention, on the other hand, it is so considered that since Cr component does not coagulate on the neck of the particles, La which does not exist in the perovskite crystalline phase and Cr component which has vaporized react together to form a liquid phase during the sintering, enabling the cations to be diffused at an increased rate among the particles, contributing to improving sintering property, and making it possible to obtain a sintered product of a dense structure even by the sintering at a low temperature. According to the present invention, La that contributes to improving low-temperature sintering property can be generated by adding an La oxide during the sintering, and can be further generated by adding an oxide of a rare earth element other than La, that were exemplified above. That is, when an oxide of a rare earth element other than La is added during the sintering, La in the perovskite crystalline phase is substituted by other rare earth element in the oxide that is added, and the sintering property at low temperatures is improved by La that is substituted.

According to the present invention, therefore, when the excess percentage |P(u)| of the rare earth element (R) is expressed by the following formula, $$P(u)=u/(x+y+z)$$

it is essential that the value P(u) lies within a range of from 0.0001 to 0.20 and, preferably, from 0.05 to 0.1 as expressed by the above-mentioned formula (a). That is, when the value P(u) is smaller than the above-mentioned range, it becomes difficult to obtain a sufficiently dense sintered product through the firing at low temperatures since there does not exist sufficient amount of La that contributes to improving the sintering property at low temperatures. Therefore, the obtained electrically conducting ceramics possesses an open porosity which is larger than 0.5%. When the value P(u) becomes larger than the above-mentioned range, on the other hand, the electrically conducting ceramics exhibits a small electric conductivity and loses stability in a reducing atmosphere such as hydrogen or water vapor atmosphere. When the ceramics is used as the constituent members of the fuel cells, therefore, the ceramics may be decomposed while the electric power is being generated.

In the present invention, furthermore, when the Mg content |Q(v)| in the ceramics is represented by the following formula, $$Q(v)=(y+v)/(x+y+z)$$

it is essential that the value Q(v) exists within a range of from 0.01 to 0.60 as represented by the aforementioned formula (b). When the value Q(v) is larger than the above-mentioned range, the open porosity of the ceramics becomes larger than 0.5%, and the ceramics tends to become easily decomposed in a reducing atmosphere or tends to become easily decomposed upon contact with hydrogen or water vapor, imposing limitation upon its use. When the value Q(v) is smaller than the above-mentioned range, on the other hand, the ceramics becomes unsatisfactory with respect to the electric conductivity.

In the present invention, furthermore, the amount of Mg (y+v) in the ceramics needs not be excessively set (i.e., v may be 0) with respect to the above-mentioned reference crystalline composition so far as the above-mentioned conditions are satisfied. In this case, it is desired that the value Q(v) (where v=0) lies within a range of from 0.01 to 0.20, especially from 0.05 to 0.15. That is, it is desired that x, y and z satisfy the following formula (d), $$0.01 \leq y/(x+y+z) \leq 0.20 \qquad (d)$$

Furthermore, when v<0, i.e., when Mg is contained in an excess amount with respect to the reference crystalline composition, it is desired that the value Q(v)(where v>0) is larger than 0.20 but is not larger than 0.60, and is, particularly, from 0.30 to 0.50. That is, it is desired that v satisfies the following formula (e) and, particularly, the following formula (g), $$0.20 < (y+v)/(x+y+z) \leq 0.60 \qquad (e)$$

$$0.30 \leq (y+v)/(x+y+z) \leq 0.50 \qquad (g)$$

During the electric power generating, in general, different gases flow both side of the collector member in the fuel cell and the gas flow causes stress within the collector member. According to the present invention, the stress can be reduced due to the excess amount of Mg, whereby it can be prevented the collector member from breaking.

In the present invention, the oxide phase based upon the above-mentioned excess amounts of rare earth elements is formed as, for example, an excess amount of La or the like is precipitated in the form of an oxide like $La_2O_3$. Therefore, the oxide phase is desirably precipitated in a size of from 20 nm to 5 μm and, particularly, from 50 to 3000 nm at triple points of perovskite chief crystalline particles. Even when precipitated in small amounts on the interface between the two chief crystalline particles, it is desired that the oxide has a size which is not larger than 30 nm. That is, the oxide that is precipitated between the two chief crystalline particles impairs the movement of electrons between the particles and causes the electric conductivity to decrease. According to the present invention, the oxide phase is precipitated on the triple points, so that the Mg-substituted $LaCrO_3$ phase which is a highly electrically conducting phase becomes a continuous phase. This makes it possible to effectively avoid the drop in the electric conductivity despite the oxide phase is precipitated. In the present invention, the triple point stands for a grain boundary formed by at least three or more crystalline particles.

When Mg is contained in an excess amount, it may be precipitated as an MgO simple substance, MgO solid solution or a composite oxide of a rare earth element such as La. It is desired that the oxide is deposited mostly on the triple points. This prevents the electric conductivity from decreasing.

In order to improve the electric conductivity and strength, it is desired that the above-mentioned particles precipitated have a diameter of from 0.1 to 10 μm, especially from 1 to 5 μm, and the particles are dispersed almost uniformly. When the oxide of La or the like is precipitated between two chief crystalline particles, the motion of electron traversing the grain boundary is disturbed, resulting in that the electric conductivity is lowered. Therefore, it is prefered that the oxide is not precipitated between two chief crystalline particles.

The above-mentioned values x to z, u and v are found through calculation in a manner as described below. That is, (x+u), (y+v) and z are found by, for example, the elemental analysis of the sintered product relying upon an ICP (Inductively Coupled Plasma) Atomic Emission Spectroscopy. Then, the sintered product is immersed in the hydrochloric acid or the like acid to extract the perovskite crystalline phase, thereby to find x, y and z by the elemental analysis replying upon the ICP Atomic Emissioon Spectroanalysis.

(Preparation of Electrically Conducting Ceramics)

The electrically conducting ceramics of the present invention is prepared by using, as a starting material, a perovskite composite oxide powder containing La, Cr and Mg. The composite oxide can be prepared by calcining a mixture of, for example, $La_2O_3$, MgO and $Cr_2O_3$ at 1000° to 1500° C. followed by pulverization. In this case, it is desired that the amounts of the oxides are so set that the atomic ratios of La, Cr and Mg in the mixture are suited for obtaining the above-mentioned reference composition of perovskite crystals. When part of La is to be substituted by other rare earth elements or alkaline earth metals, oxides of such elements should be mixed.

Next, the obtained composite oxide powder is mixed with an oxide powder that contains a rare earth element, and the mixed powder is molded into a predetermined shape. The oxide powder containing the rare earth element is used in such an amount that the amount of the rare earth element corresponds to the above-mentioned excess amount ((u) in the formula (II)). To prepare the electrically conducting ceramics (v>0) containing excess amounts of Mg, use is made of the oxide powder containing the rare earth element and the oxide of Mg in an amount that corresponds to (v) in the formula (II).

It is desired that the powder of the oxide of the above-mentioned rare earth element usually has an average particle diameter of from about 0.1 to about 5 µm, especially from 0.1 to 3 µm. The rare earth element is mixed with the composite oxide powder not only in the form of an oxide but also in the form of a compound capable of forming an oxide upon the heat-treatment such as hydroxide, carbonate or nitrate.

Instead of the perovskite composite oxide powder, it can be used the mixture of oxide powders capable of constituting the perovskite composite oxide, such as $La_2O_3$ powder, MgO powder and $Cr_2O_3$ powders. That is, the mixture of these oxide powders may be mixed with the oxide powder containing rare earth element.

The mixed powder can be molded into any desired shape by a widely known means such as metal mold press, cold hydrostatic press, extrusion molding or doctor blade method.

Upon firing the molded article in an oxidizing atmosphere, there is obtained a sintered product having perovskite crystals as chief crystals and having an oxide phase of an excess of rare earth element. Since sintering property at low temperatures has been improved according to the present invention, the firing is effected at a low temperature of from 1300° to 1700° C. and, particularly, from 1400° to 1600° C. to obtain a sintered product of a dense structure in which the chief crystals have an average particle diameter of from 1 to 20 µm. This is very advantageous from the standpoint of cost since the sintering temperature is low. The sintering time may be usually from about 2 to about 5 hours. From the standpoint of promoting the sintering, it is desired that the oxygen partial pressure in the oxidizing atmosphere is not lower than $10^{-3}$ atms. In such oxidizing atmosphere, $Cr_2O_3$ is generated dominantly and react with the excess $La_2O_3$ easily. Therefore, it is considered the coagulation of $Cr_2O_3$ on neck is suppressed, whereby the sintering is promoted. When the oxygen partial pressure is lower than $10^{-3}$ atms, Cr vaporizes predominantly during the sintering; i.e., Cr that has vaporized easily reacts with oxygen in the gaseous phase and, as a result, $Cr_2O_3$ coagulates on the neck and the sintering is impaired. In this case, the sintering temperature should be not smaller than 1400° C.

In the present invention, the obtained sintered product can be used by itself as the electrically conducting ceramics of final product. Generally, however, it is desired to heat-treat the sintered product in an oxygen atmosphere having an oxygen partial pressure of not lower than $10^{-3}$ atms at a temperature of not lower than 1000° C. and, particularly, not lower than 1300° C. for 2 to 10 hours. By such heat-treatment, the sintering is promoted more effetively. That is, with the above-mentioned firing only, oxides of rare earth elements such as $La_2O_3$ used in excess amounts, often exist between the two particles. The oxides between the two particles lower the electric conductivity of the sintered product, i.e., of the ceramics. By effecting the heat treatment, however, the oxides precipitated between the two particles migrate onto the triple points of the chief crystal phase. The oxides precipitated on the triple points remain in an isolated state and do not interrupt the motion of holes or electrons among the particles, making it possible to obtain a high electric conductivity. The heat treatment can be effected as a separate step after the sintering is once finished. However, since the above-mentioned sintering conditions are satisfying the heat-treating conditions, it is desired from an industrial point of view to continue the heat treatment without changing the firing conditions.

The ceramics of the present invention has the composition satisfied with the formula (I) and (II), therefore it exhibits improved sintering property. Besides, in accordance with the process of the present invention, the very high dense sintering product is obtained. That is, by firing in an atmosphere having an oxygen partial pressure not smaller than $10^{-3}$ atm, a high dense sintering product and by further heat-treating the sintering product in an atmosphere having an oxygen partial pressure not smaller than $10^{-3}$ atm at a temperature of not smaller than 1000° C., the density of the sintering product becomes higher.

According to the present invention as described above, there is obtained a highly dense electrically conducting ceramics having high electric conductivity and an open porosity of not larger than 0.5% and, particularly, not larger than 0.3%, exhibiting chemically stable property in an oxidizing atmosphere and in a reducing atmosphere. In particular, the electric conductivity of the ceramics is as very high as 15 s/cm or more at a fuel cell operation temperature of 1000° C. Accordingly, the electrically conducting ceramics of the present invention can be very effectively used as collector members for fuel cells.

(Use)

Referring to FIG. 1 which is a perspective view illustrating, in a disassembled manner, a unit structure in a representative flat-plate fuel cell, the cell is equipped with a plate-like solid electrolyte 1, an air electrode 2, a fuel electrode 3, and collector members (separators) 4, 4.

The solid electrolyte 1 comprises $ZrO_2$ stabilized with $Y_2O_3$, and has the air electrode 2 laminated on one surface thereof and has the fuel electrode 3 laminated on the other surface thereof. The air electrode 2 is composed of (La, Sr)$MnO_3$ or (La, Ca)$MnO_3$, and the fuel electrode 3 is composed of an Ni-$ZrO_2$ ($Y_2O_3$-containing) cermet or the like. One of the collector members 4, 4 is in contact with the air electrode 2, and the other collector member 4 is in contact with the fuel rod 3. That is, the collector members 4, 4 are for connecting the cells. The collector member 4 connected to the air electrode 2 is connected to the fuel electrode of a cell (not shown) contiguous to one side of the cell, and the collector member 4 connected to the fuel rod 3 is connected to the air electrode of a cell (not shown) contiguous to the other side of the cell.

In the above-mentioned cell, an oxygen-containing gas (e.g., air) is supplied to the side of the air electrode 2 and a fuel gas (e.g., hydrogen gas) is supplied to the side of the fuel electrode 3 to generate the electric power at a temperature of 1000° to 1050° C. Thus, the collector member 4 plays the roles of coming into contact with the oxygen-containing gas on one surface, coming into contact with the hydrogen gas on the other surface, and completely separating these gases. Therefore, the collector member 4 must be highly dense, must have high electric conductivity, and must remain chemically stable against the oxygen-containing gas and hydrogen gas. An $LaCrO_3$ material in which CaO or SrO is solid-solubilized has heretofore been used as the collector member 4 without, however, satisfying these properties to a sufficient degree. The above-mentioned electrically conducting ceramics of the present invention is excellent in exhibiting the above-mentioned properties and can be used very effectively as the collector member 4. In fact, as will be described later in Examples, the fuel cell using collector members 4 composed of the electrically conducting ceramics of the present invention exhibits stable power generating characteristics.

Properties required for the collector member 4 (separator) are also required by a collector member such as an interconnector used for cells in, for example, a cylindrical fuel cell. The same also holds for the collector members such as gas diffusers. Therefore, the electrically conducting ceramics of the present invention can be preferably used even for such collector members. The electrically conducting ceramics of the present invention is very cheaply prepared since it is fired at a low temperature and is very advantageous from the standpoint of decreasing the cost of the fuel cell and mass-production.

EXAMPLES

The invention will now be described by way of Examples.

(Example 1)

Commercially available oxides $LaO_{3/2}$, $MgCO_3$ and $CrO_{3/2}$ having a purity of 99.9% were mixed together in such amounts that the following atomic ratios were accomplished,

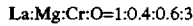

La:Mg:Cr:O=1:0.4:0.6:3 and were pulverized for 12 hours by a ball mill using zirconia balls. The mixture was then calcined at 1400° C. for 5 hours to effect the solid-phase reaction in order to obtain a powder of a perovskite composite oxide having the following composition formula, $LaMg_{0.4}Cr_{0.6}O_3$.

The $LaO_{3/2}$ and the $MgCO_3$ powder were added at ratios shown in Table 1 per mol of the above composite oxide powder (formula weight of the above composition formula is regarded to be one mol), and the mixture was pulverized again for 10 hours using zirconia balls. The obtained mixture powders were molded into square poles measuring 5 mm×5 mm×45 mm, and were fired in the open air (oxygen partial pressure of 0.2 atms) under the conditions shown in Table 1 to obtain sintered products of samples Nos. 2 to 15.

For the purpose of comparison, furthermore, a powder of a commercially available perovskite composite oxide represented by the composition formula, $LaMg_{0.1}Cr_{0.9}O_3$, was molded in the same manner as described above and was fired in Ar at 2000° C. for 3 hours. This sintered product is referred to as sample No. 1.

The obtained sintered products were quantitatively analyzed for their elements and were evaluated for their properties according to methods described below. The results were as shown in Table 2.

(Quantitative Analysis of Elements)

The sintered products were measured for their amounts of elements by the ICP emission spectroanalysis in order to find atomic ratios.

The sintered products were pulverized and immersed in the hydrochloric acid to dissolve and remove phases other than the perovskite crystals. The composition of the remaining perovskite crystalline phase was quantitatively analyzed based upon the ICP emission spectroanalysis to find atomic ratios. The atomic ratio of the perovskite crystalline phase was compared with the atomic ratio of the sintered product that has been found already to calculate x, y, z, u and v and to find the values P(u) and Q(v). In Table 2, the values P(u) are shown being multiplied by 100 times for the sake of convenience.

It was confirmed from the results of quantitative analysis that Cr existed in all perovskite crystalline phases.

(Evaluation of Physical Properties)

Open Porosity

The sintered products were measured for their open porosities by the Archimedes' method to evaluate their sintering properties.

Electric Conductivity

The sintered products were prepared quite in the same manner as the above-mentioned samples but changing the size of the samples into 2 mm×3 mm×20 mm, and the obtained sintered products were measured for their electric conductivities relying upon the four-wire method at 1000° C.

Stability in the Reducing Atmosphere

After being held in a hydrogen atmosphere containing 5% of water vapor at 1000° C. for 24 hours, the sintered products were observed in regard to their surfaces to evaluate the stability. The reference of evaluation was as follows:

○: The sintered product exhibited good stability without any change on the surfaces.

X: The sintered product was unstable being decomposed from the surfaces.

TABLE 1

| Sample No. | Perovskite composite oxide | Additive (mol) | | Firing conditions | |
|---|---|---|---|---|---|
| | | $LaO_{3/2}$ | $MgCO_3$ | Temp. (°C.) | Time (hr) |
| *1 | $LaMg_{0.1}Cr_{0.9}O_3$ | 0 | 0 | 2000 | 3 |
| 2 | $LaMg_{0.4}Cr_{0.6}O_3$ | 0.01 | 0.02 | 1500 | 3 |
| 3 | $LaMg_{0.4}Cr_{0.6}O_3$ | 0.01 | 0.04 | 1500 | 3 |
| 4 | $LaMg_{0.4}Cr_{0.6}O_3$ | 0.01 | 0.2 | 1500 | 3 |
| 5 | $LaMg_{0.4}Cr_{0.6}O_3$ | 0.01 | 0.4 | 1500 | 3 |
| 6 | $LaMg_{0.4}Cr_{0.6}O_3$ | 0.01 | 0.6 | 1500 | 3 |
| 7 | $LaMg_{0.4}Cr_{0.6}O_3$ | 0.01 | 0.8 | 1500 | 3 |
| *8 | $LaMg_{0.4}Cr_{0.6}O_3$ | 0.01 | 1.2 | 1500 | 3 |
| *9 | $LaMg_{0.4}Cr_{0.6}O_3$ | 0.0001 | 0.4 | 1600 | 5 |
| 10 | $LaMg_{0.4}Cr_{0.6}O_3$ | 0.0002 | 0.4 | 1600 | 5 |
| 11 | $LaMg_{0.4}Cr_{0.6}O_3$ | 0.02 | 0.4 | 1600 | 5 |
| 12 | $LaMg_{0.4}Cr_{0.6}O_3$ | 0.1 | 0.4 | 1500 | 5 |
| 13 | $LaMg_{0.4}Cr_{0.6}O_3$ | 0.2 | 0.4 | 1500 | 5 |
| 14 | $LaMg_{0.4}Cr_{0.6}O_3$ | 0.4 | 0.4 | 1500 | 5 |
| *15 | $LaMg_{0.4}Cr_{0.6}O_3$ | 0.6 | 0.4 | 1500 | 5 |

Note)
Samples marked with * are those of Comparative Examples and other samples are those of the present invention (the same holds hereinafter).
The amount (mols) of $MgCO_3$ is the one reckoned as MgO.

TABLE 2

| Sample No. | La(x + u)/Mg(y + v)/Cr(z) | | | | | P(u) X100 | Q(v) | Open porosity (%) | Electric conductivity (s/cm) | Stability in the reducing atmosphere | Crystalline phase other than perovskite crystals |
|---|---|---|---|---|---|---|---|---|---|---|---|
| | x | u | y | v | z | | | | | | |
| *1 | 50 | 0 | 5 | 0 | 45 | 0 | 0.05 | 18.3 | 10 | ○ | — |
| 2 | 50 | 0.5 | 20 | 1 | 30 | 0.5 | 0.21 | 0.5 | 16 | ○ | $LaO_{3/2}MgO$ |
| 3 | 50 | 0.5 | 20 | 2 | 30 | 0.5 | 0.22 | 0.3 | 18 | ○ | $LaO_{3/2}MgO$ |
| 4 | 50 | 0.5 | 20 | 10 | 30 | 0.5 | 0.30 | 0 | 18 | ○ | $LaO_{3/2}MgO$ |
| 5 | 50 | 0.5 | 20 | 20 | 30 | 0.5 | 0.40 | 0 | 16 | ○ | $LaO_{3/2}MgO$ |
| 6 | 50 | 0.5 | 20 | 30 | 30 | 0.5 | 0.50 | 0 | 17 | ○ | $LaO_{3/2}MgO$ |
| 7 | 50 | 0.5 | 20 | 40 | 30 | 0.5 | 0.60 | 0.2 | 15 | ○ | $LaO_{3/2}MgO$ |
| *8 | 50 | 0.5 | 20 | 60 | 30 | 0.5 | 0.80 | 0.8 | 4 | ○ | $LaO_{3/2}MgO$ |
| *9 | 50 | 0.005 | 20 | 20 | 30 | 0.005 | 0.40 | 15.3 | 1 | ○ | $LaO_{3/2}MgO$ |
| 10 | 50 | 0.01 | 20 | 20 | 30 | 0.01 | 0.40 | 0.5 | 17 | ○ | $LaO_{3/2}MgO$ |
| 11 | 50 | 1.0 | 20 | 20 | 30 | 1.0 | 0.40 | 0.3 | 18 | ○ | $LaO_{3/2}MgO$ |
| 12 | 50 | 5.0 | 20 | 20 | 30 | 5.0 | 0.40 | 0.1 | 19 | ○ | $LaO_{3/2}MgO$ |
| 13 | 50 | 10.0 | 20 | 20 | 30 | 10.0 | 0.40 | 0 | 16 | ○ | $LaO_{3/2}MgO$ |
| 14 | 50 | 20.0 | 20 | 20 | 30 | 20.0 | 0.40 | 0 | 16 | ○ | $LaO_{3/2}MgO$ |
| *15 | 50 | 30.0 | 20 | 20 | 30 | 30.0 | 0.40 | 0 | 13 | x | $LaO_{3/2}MgO$ |

As will be obvious from the results of Table 2, the sample No. 9 in which the excess amount u of La is smaller than the range of the present invention, exhibits an open porosity of not smaller than 15%, and does not have a dense structure.

The sample No. 15 in which the excess amount u of La is larger than the range of the present invention, was decomposed in a hydrogen/water vapor atmosphere.

The sample No. 8 in which the Mg content (Q(v)) is larger than the range of the present invention, was not decomposed in a hydrogen/water vapour, but the electirc conductivity was decreased.

On the other hand, each sintered product of the present invention was obtained by firing at a temperature of from 1500° to 1600° C. and had an open prosity of not larger than 0.5%. Some sintered products among them were a high dense product which has an open prosity of about 0%. Also, each sintered product of the present invention has an electric conductivity of not smaller than 15 s/cm at a temperature of 1000° C. and was not decomposed in a hydrogen/water vapour.

Each sintered product was observed using an electron microscope, as a result, it was learned that an oxide phase comprising an oxide of La and Mg was precipitated on the triple points of the perovskite cristalline particles.

(Example 2)

Using a mixed powder which has same composition as that of the sample No. 3 or No. 6 shown in Table 1, sintered products were prepared under a variety of conditions shown in Table 3.

The open prosity and electric conductivity of the obtained sintered products were shown as Table 3. The sintered products were observed by a scanning electron microscope to investigate the precipitation of $La_2O_3$. The results were as shown in Table 3.

According to the results of Table 3, by firing at a temperature of not smaller than 1300° C. in an atmosphere having oxygen partial pressure of not smaller than $10^{-3}$ atm, $La_2O_3$ was precipitated on the triple points. On the other hand, when firing is carried out at a temperature of smaller than 1300° C. or in an atmosphere having oxygen partial pressure of smaller than $10^{-3}$ atm, $La_2O_3$ was precipitated on the triple points and between two chief crystalline particles and the electric conductivity of the obtained sintered product was decreased. From this results, it was learned that the electric conductivity of the sintered product was decreased by precipitating of $La_2O_3$ between two particles. Also, the product obtained by firing the mixed powder of sample No. 3 in atomsphere having oxygen partial pressure of $10^{-4}$ atm or the product obtained by firing the mixed powder of sample No. 6 at 1200° C. was heat-treated for 2 hours at 1200° C. in an atomsphere having oxygen partial pressure of 0.2 atm to obtain a sintered product. The sintered product obtained from sample No. 3 has an open porosity of 0.2% and an electric conductivity of 15 s/cm, and the sintered product obtained from sample No. 6 has an open porosity of 0.3% and an electric conductivity of 16 s/cm. In these sintered products, precipitation of $La_2O_3$ between two crystalline particles was not observed.

TABLE 3

| Sample No. | Condition of firing | | | Open prosity (%) | Electric conductivity (s/cm) | Precipitation of $La_2O_3$ | |
|---|---|---|---|---|---|---|---|
| | Temp. (°C.) | Time (hr) | $O_2$ partially pressure(atom) | | | triple point | between two particles |
| 3 | 1400 | 5 | 1.0 | 0.4 | 18 | present | none |
| | 1500 | 5 | 0.2 | 0.2 | 17 | present | none |
| | 1500 | 5 | 0.0001 | 3.2 | 6 | present | present |
| | 1600 | 2 | 0.001 | 0.5 | 19 | present | none |

TABLE 3-continued

| Sample No. | Condition of firing | | | Open prosity (%) | Electric conduc- tivity (s/cm) | Precipitation of $La_2O_3$ | |
|---|---|---|---|---|---|---|---|
| | Temp. (°C.) | Time (hr) | $O_2$ partially pressure(atom) | | | triple point | between two particles |
| 6 | 1200 | 10 | 1.0 | 1.3 | 8 | present | present (little) |
|   | 1500 | 5  | 0.2 | 0.1 | 20 | present | none |
|   | 1500 | 5  | 0.2 | 0.2 | 17 | present | none |
|   | 1600 | 2  | 0.001 | 0 | 20 | present | none |
|   | 1600 | 5  | 0.2 | 0 | 20 | present | none |

(Example 3)

Commercially available oxides $LaO_{3/2}$, $MgCO_3$, $CrO_{3/2}$, $SrCO_3$, $CaCO_3$ and $BaCO_3$ having a purity of 99.9% were mixed together in such amounts that the atomic ratios corresponded to the perovskite composite oxides of compositions shown in Table 4, and were pulverized for 12 hours by a ball mill using zirconia balls. The mixtures were then calcined at 1400° C. for 5 hours to effect the solid-phase reaction in order to obtain powders of perovskite composite oxides having compositions shown in Table 4.

The $LaO_{3/2}$ powder was added at ratios shown in Table 4 per mol of the above composite oxide powder, and the mixture was pulverized again for 10 hours using zirconia balls. The obtained mixture powders were molded into square poles measuring 5 mm×5 mm×45 mm, and were fired in the open air (oxygen partial pressure of 0.2 atms) under the conditions shown in Table 4 to obtain sintered products of samples Nos. 17 to 29.

For the purpose of comparison, furthermore, a powder of a commercially, available perovskite composite oxide represented by the composition formula, $La_{0.9}Sr_{0.1}CrO_3$, was molded in the same manner as described above and was fired in Ar at 2000° C. for 2 hours. This sintered product is referred to as sample No. 16.

The obtained sintered products were quantitatively analyzed for their elements and were evaluated for their properties according to methods same as those of Example 1. The results were as shown in Table 5.

TABLE 4

| Sample No. | Perovskite composite oxide | Additive (mol) $LaO_{3/2}$ | Firing conditions | |
|---|---|---|---|---|
| | | | Temp. (°C.) | Time (hr) |
| *16 | $La_{0.9}Sr_{0.1}CrO_3$ | 0 | 2000 | 2 |
| 17 | $LaMg_{0.1}Cr_{0.9}O_3$ | 0.0002 | 1500 | 10 |
| 18 | $LaMg_{0.1}Cr_{0.9}O_3$ | 0.0006 | 1500 | 10 |
| 19 | $LaMg_{0.1}Cr_{0.9}O_3$ | 0.01 | 1500 | 10 |
| 20 | $LaMg_{0.1}Cr_{0.9}O_3$ | 0.02 | 1500 | 10 |
| 21 | $LaMg_{0.1}Cr_{0.9}O_3$ | 0.04 | 1400 | 10 |
| 22 | $LaMg_{0.1}Cr_{0.9}O_3$ | 0.06 | 1400 | 10 |
| 23 | $LaMg_{0.1}Cr_{0.9}O_3$ | 0.1 | 1400 | 10 |
| 24 | $LaMg_{0.2}Cr_{0.8}O_3$ | 0.01 | 1500 | 10 |
| 25 | $LaMg_{0.3}Cr_{0.7}O_3$ | 0.01 | 1500 | 10 |
| 26 | $LaMg_{0.4}Cr_{0.6}O_3$ | 0.01 | 1600 | 10 |
| 27 | $La_{0.9}Sr_{0.1}Mg_{0.1}Cr_{0.9}O_3$ | 0.02 | 1600 | 5 |
| 28 | $La_{0.9}Ca_{0.1}Mg_{0.1}Cr_{0.9}O_3$ | 0.02 | 1600 | 5 |
| 29 | $La_{0.9}Ba_{0.1}Mg_{0.1}Cr_{0.9}O_3$ | 0.02 | 1600 | 5 |

Note)
In the samples Nos. 27–29, La in the chief crystals is partly substituted by Sr, Ca or Ba.
The total amount of the substituted amount and Mg amount corresponds to "x".

TABLE 5

| Sample No. | R(x + u)/ Mg(y + v)/Cr(z) | | | | | P(u) X100 | Q(v) v = 0 | Open porosity (%) | Electric conductivity (s/cm) | Stability in the reducing atmosphere | Crystalline phase other than perovskite crystals |
|---|---|---|---|---|---|---|---|---|---|---|---|
| | x | u | y | v | z | | | | | | |
| *16 | La45 Sr 5 | 0 | 0 | 0 | 50 | — | 0 | 0.8 | 16 | o | — |
| 17 | La50 | 0.01 | 5 | 0 | 45 | 0.01 | 0.05 | 0.4 | 18 | o | $LaO_{3/2}$ |
| 18 | La50 | 0.03 | 5 | 0 | 45 | 0.03 | 0.05 | 0.3 | 20 | o | $LaO_{3/2}$ |
| 19 | La50 | 0.5 | 5 | 0 | 45 | 0.5 | 0.05 | 0.3 | 20 | o | $LaO_{3/2}$ |
| 20 | La50 | 1.0 | 5 | 0 | 45 | 1.0 | 0.05 | 0.2 | 19 | o | $LaO_{3/2}$ |
| 21 | La50 | 2.0 | 5 | 0 | 45 | 2.0 | 0.05 | 0.0 | 19 | o | $LaO_{3/2}$ |
| 22 | La50 | 3.0 | 5 | 0 | 45 | 3.0 | 0.05 | 0.0 | 19 | o | $LaO_{3/2}$ |
| 23 | La50 | 5.0 | 5 | 0 | 45 | 5.0 | 0.05 | 0.1 | 19 | o | $LaO_{3/2}$ |
| 24 | La50 | 0.5 | 10 | 0 | 40 | 0.5 | 0.10 | 0.1 | 20 | o | $LaO_{3/2}$ |
| 25 | La50 | 0.5 | 15 | 0 | 35 | 0.5 | 0.15 | 0.1 | 22 | o | $LaO_{3/2}$ |
| 26 | La50 | 0.5 | 20 | 0 | 30 | 0.5 | 0.20 | 0.3 | 24 | o | $LaO_{3/2}$ |
| 27 | La45 Sr 5 | 1.0 | 5 | 0 | 45 | 1.0 | 0.10 | 0.1 | 22 | o | |

TABLE 5-continued

| Sample No. | R(x + u)/Mg(y + v)/Cr(z) | | | | P(u) X100 | Q(v) v = 0 | Open porosity (%) | Electric conductivity (s/cm) | Stability in the reducing atmosphere | Crystalline phase other than perovskite crystals |
|---|---|---|---|---|---|---|---|---|---|---|
| | x | u | y | v | z | | | | | |
| 28 | La45 Ca 5 | 1.0 | 5 | 0 | 45 | 1.0 | 0.10 | 0.3 | 21 | ○ | $LaO_{3/2}$ |
| 29 | La45 Ba 5 | 1.0 | 5 | 0 | 45 | 1.0 | 0.10 | 0.3 | 21 | ○ | $LaO_{3/2}$ |

According to the results of Table 5, the sintered products obtained in firing at a temperature of 1300° to 1700° C., especially 1400° to 1600° C., in accordance with the process of the present invention, have an open prosity of not larger than 0.4% and an electric conductivity of not smaller than 18 s/cm, and exhibit good stability in the reducing atmosphere.

(Example 4)

Using a mixed powder which has same composition as that of the sample No. 20 or No. 27 shown in Table 4, sintered products were prepared under a variety of conditions shown in Table 6.

The open prosity and electric conductivity of the obtained sintered products were shown as Table 6. The sintered products were observed by a scanning electron microscope to investigate the precipitation of $La_2O_3$. The results were as shown in Table 6.

According to the results of Table 6, by firing and heat-treating at a temperature of not smaller than 1300° C. in an atmosphere having oxygen partial pressure of not smaller than $10^{-3}$ atm, $La_2O_3$ was precipitated on the triple points. On the other hand, when firing and heat-treating is carried out at a temperature of smaller than 1300° C. or in an atmosphere having oxygen partial pressure of smaller than $10^{-3}$ atm, $La_2O_3$ was precipitated on the triple points and between two chief crystalline particles and the electric conductivity of the obtained sintered product was decreased.

From this results, it was learned that the electric conductivity of the sintered product was decreased by precipitating of $La_2O_3$ between two particles.

positions shown in Tables 7A and 7B, and were pulverized for 12 hours by a ball mill using zirconia balls. The mixtures were then calcined at 1400° C. for 5 hours to effect the solid-phase reaction in order to obtain powders of perovskite composite oxides having compositions shown in Tables 7A and 7B.

A powder of an oxide ($REO_{3/2}$) of a rare earth element was added at ratios shown in Tables 7A and 7B per mol of the above composite oxide powder, and the mixture was pulverized again for 10 hours using zirconia balls. The obtained mixture powders were molded into square poles measuring 5 mm×5 mm×45 mm, and were fired in the open air (oxygen partial pressure of 0.2 atms) under the conditions shown in Tables 7A and 7B to obtain sintered products of samples Nos. 31 to 52.

For the purpose of comparison, furthermore, a powder of a commercially available perovskite composite oxide represented by the composition formula, $LaMg_{0.1}Cr_{0.9}O_3$, was molded in the same manner as described above and was fired in Ar at 2100° C. for 1 hour. This sintered product is referred to as sample No. 30.

The obtained sintered products were quantitatively analyzed for their elements and were evaluated for their properties according to methods same as those of Example 1. The results were as shown in Tables 8A and 8B.

TABLE 6

| Sample No. | Condition of firing | | | Open prosity (%) | Electric conductivity (s/cm) | Precipitation of $La_2O_3$ | |
|---|---|---|---|---|---|---|---|
| | Temp. (°C.) | Time (hr) | $O_2$ partially pressure(atom) | | | triple point | between two particles |
| 27 | 1600 | 5 | 1.0 | 0.6 | 21 | present | none |
| | 1600 | 5 | 0.1 | 0.1 | 20 | present | none |
| | 1500 | 5 | 0.0005 | 7.5 | 12 | none | present |
| | 1600 | 2 | 0.001 | 0.6 | 20 | present | none |
| 20 | 1200 | 5 | 1.0 | 0.9 | 16 | present | present (little) |
| | 1500 | 5 | 1.0 | 0 | 20 | present | none |
| | 1500 | 5 | 0.0001 | 9.1 | 10 | none | present |
| | 1600 | 2 | 0.01 | 0.4 | 21 | present | none |

(Example 5)

Commercially available oxides $LaO_{3/2}$, $MgCO_3$, NiO, $Fe_2O_3$, $CrO_{3/2}$, $SrCO_3$ and $CaCO_3$ having a purity of 99.9% were mixed together in such amounts that the atomic ratios corresponded to the perovskite composite oxides of com-

TABLE 7A

| Sample No. | Perovskite composite oxide | Additive | (mol) REO$_{3/2}$ | Firing conditions Temp. (°C.) | Time (hr) |
|---|---|---|---|---|---|
| *30 | LaMg$_{0.1}$Cr$_{0.9}$O$_3$ | — |  | 2100 | 1 |
| 31 | LaMg$_{0.1}$Cr$_{0.9}$O$_3$ | YO$_{3/2}$ | 0.0001 | 1700 | 2 |
| 32 | LaMg$_{0.1}$Cr$_{0.9}$O$_3$ | YO$_{3/2}$ | 0.0002 | 1600 | 5 |
| 33 | LaMg$_{0.1}$Cr$_{0.9}$O$_3$ | YO$_{3/2}$ | 0.01 | 1600 | 5 |
| 34 | LaMg$_{0.1}$Cr$_{0.9}$O$_3$ | YO$_{3/2}$ | 0.02 | 1500 | 5 |
| 35 | LaMg$_{0.1}$Cr$_{0.9}$O$_3$ | YO$_{3/2}$ | 0.04 | 1500 | 5 |
| 36 | LaMg$_{0.1}$Cr$_{0.9}$O$_3$ | YO$_{3/2}$ | 0.1 | 1400 | 8 |
| 37 | LaMg$_{0.1}$Cr$_{0.9}$O$_3$ | YO$_{3/2}$ | 0.2 | 1400 | 8 |
| 38 | LaMg$_{0.1}$Cr$_{0.9}$O$_3$ | YO$_{3/2}$ | 0.4 | 1400 | 5 |
| *39 | LaMg$_{0.1}$Cr$_{0.9}$O$_3$ | YO$_{3/2}$ | 0.6 | 1400 | 5 |
| 40 | LaMg$_{0.1}$Cr$_{0.9}$O$_3$ | YbO$_{3/2}$ | 0.02 | 1600 | 5 |
| 41 | LaMg$_{0.1}$Cr$_{0.9}$O$_3$ | CeO$_{3/2}$ | 0.06 | 1600 | 5 |
| 42 | LaMg$_{0.1}$Cr$_{0.9}$O$_3$ | SmO$_{3/2}$ | 0.02 | 1600 | 5 |
| 43 | LaMg$_{0.1}$Cr$_{0.9}$O$_3$ | NdO$_{3/2}$ | 0.1 | 1600 | 5 |
| 44 | LaMg$_{0.1}$Cr$_{0.9}$O$_3$ | ErO$_{3/2}$ | 0.01 | 1600 | 5 |
| 45 | LaMg$_{0.1}$Cr$_{0.9}$O$_3$ | DyO$_{3/2}$ | 0.04 | 1600 | 5 |

TABLE 7B

| Sample No. | Perovskite composite oxide | Additive | (mol) REO$_{3/2}$ | Firing conditions Temp. (°C.) | Time (hr) |
|---|---|---|---|---|---|
| 46 | LaMg$_{0.04}$Cr$_{0.96}$O$_3$ | YO$_{3/2}$ | 0.04 | 1500 | 5 |
| 47 | LaMg$_{0.2}$Cr$_{0.8}$O$_3$ | YO$_{3/2}$ | 0.04 | 1500 | 5 |
| 48 | LaMg$_{0.3}$Cr$_{0.7}$O$_3$ | YO$_{3/2}$ | 0.04 | 1500 | 5 |
| 49 | LaMg$_{0.4}$Cr$_{0.6}$O$_3$ | YO$_{3/2}$ | 0.04 | 1500 | 5 |
| 50 | La$_{0.9}$Ca$_{0.1}$Mg$_{0.1}$Cr$_{0.9}$O$_3$ | YbO$_{3/2}$ | 0.01 | 1500 | 8 |
| 51 | La$_{0.9}$Ca$_{0.1}$Mg$_{0.1}$Ni$_{0.1}$Cr$_{0.8}$O$_3$ | NdO$_{3/2}$ | 0.08 | 1400 | 8 |
| 52 | La$_{0.9}$Sr$_{0.1}$Mg$_{0.1}$Fe$_{0.1}$Cr$_{0.8}$O$_3$ | YO$_{3/2}$ | 0.1 | 1400 | 8 |

TABLE 8A

| Sample No. | R(x + u)/Mg(y + v)/Cr(z) | | | | | P(u) X100 | Q(v) v = 0 | Open porosity (%) | Electric conductivity (s/cm) | Stability in the reducing atmosphere | Crystalline phase other than perovskite crystals |
|---|---|---|---|---|---|---|---|---|---|---|---|
|  | x | u | y | v | z |  |  |  |  |  |  |
| *30 | La50 | 0 | 5 | 0 | 45 | — | 0.05 | 0.9 | 20 | ○ | — |
| *31 | La50 | 0.005 | 5 | 0 | 45 | 0.005 | 0.05 | 30.0 | 7 | x | — |
| 32 | La50 | 0.5 | 5 | 0 | 45 | 0.01 | 0.05 | 0.5 | 19 | ○ | La,A |
| 33 | La50 | 0.5 | 5 | 0 | 45 | 1.0 | 0.05 | 0.1 | 21 | ○ | La,A |
| 34 | La50 | 1.0 | 5 | 0 | 45 | 1.0 | 0.05 | 0.0 | 22 | ○ | La,A,Y |
| 35 | La50 | 2.0 | 5 | 0 | 45 | 2.0 | 0.05 | 0.0 | 24 | ○ | La,A,Y |
| 36 | La50 | 5.0 | 5 | 0 | 45 | 5.0 | 0.05 | 0.0 | 20 | ○ | La,A,Y |
| 37 | La50 | 10.0 | 5 | 0 | 45 | 10.0 | 0.05 | 0.0 | 18 | ○ | La,A,Y |
| 38 | La50 | 20.0 | 5 | 0 | 45 | 20.0 | 0.05 | 0.5 | 20 | ○ | La,A,Y |
| *39 | La50 | 30.0 | 5 | 0 | 45 | 30.0 | 0.05 | 1.5 | 6 | x | La,A,Y |
| 40 | La50 | 1.0 | 5 | 0 | 45 | 1.0 | 0.05 | 0.1 | 16 | ○ | La,(La,Yb)O$_3$ YbO$_{3/2}$ |
| 41 | La50 | 3.0 | 5 | 0 | 45 | 3.0 | 0.05 | 0.2 | 18 | ○ | La,(La,Ce)O$_3$ CeO$_{3/2}$ |
| 42 | La50 | 1.0 | 5 | 0 | 45 | 1.0 | 0.05 | 0.2 | 20 | ○ | La,(La,Sm)O$_3$ SmO$_{3/2}$ |
| 43 | La50 | 5.0 | 5 | 0 | 45 | 5.0 | 0.05 | 0.0 | 22 | ○ | La,(La,Nd)O$_3$ NdO$_{3/2}$ |
| 44 | La50 | 0.5 | 5 | 0 | 45 | 0.5 | 0.05 | 0.5 | 16 | ○ | La,(La,Er)O$_3$ ErO$_{3/2}$ |
| 45 | La50 | 2.0 | 5 | 0 | 45 | 2.0 | 0.05 | 0.0 | 18 | ○ | La,(La,Dy)O$_3$ DyO$_{3/2}$ |

TABLE 8B

| Sample No. | R(x + u)/Mg(y + v)/Cr(z) x | u | y | v | z | P(u) X100 | Q(v) | Open porosity (%) | Electric conductivity (s/cm) | Stability in the reducing atmosphere | Crystalline phase other than perovskite crystals |
| --- | --- | --- | --- | --- | --- | --- | --- | --- | --- | --- | --- |
| 46 | La50 | 2.0 | 2 | 0 | 48 | 2.0 | 0.02 | 0.5 | 16 | ○ | La,A,Y |
| 47 | La50 | 2.0 | 10 | 0 | 40 | 2.0 | 0.10 | 0.3 | 20 | ○ | La,A,Y |
| 48 | La50 | 2.0 | 15 | 0 | 35 | 2.0 | 0.15 | 0.1 | 22 | ○ | La,A,Y |
| 49 | La50 | 2.0 | 20 | 0 | 30 | 2.0 | 0.20 | 0.0 | 24 | ○ | La,A,Y |
| 50 | La45 Ca 5 | 0.5 | 5 | 0 | 45 | 0.5 | 0.05 | 0.1 | 16 | ○ | La, (La,Yb)O$_3$ |
| 51 | La45 Ca 5 | 4.0 | 5 | 0 | Cr40 Ni 5 | 4.0 | 0.05 | 0.4 | 18 | ○ | La, (La,Nd)O$_3$ |
| 52 | La45 Sr 5 | 5.0 | 5 | 0 | Cr40 Fe 5 | 5.0 | 0.05 | 0.2 | 16 | ○ | La,A |

In Table 8A and 8B, La, A and Y in the column of crystalline phase other than perovskite crystals have the following meanings:
La: LaO$_{3/2}$ phase
A: (La,Y)O$_3$ phase
Y: YO$_{3/2}$ phase (Example 6)

By using electrically conducting ceramics of Nos. 1, 3, 10 and 15 of Example 1, separators of the structure shown in FIG. 1 having a size of 50 mm×50 mm and a thickness of 3 mm were prepared. The separators possessed a particle diameter of 4 to 10 μm. By using a commercially available powder of 8 mol % Y$_2$O$_3$—92 mol % ZrO$_2$ having a purity of 99.9%, furthermore, a dense solid electrolyte plate having a theoretical density ratio of 99.3% and a thickness of 0.25 mm was prepared. By applying a mixture powder of 70 wt % NiO—30 wt % zirconia (containing 8 mol % of Y$_2$O$_3$) onto the one surface maintaining a thickness of 30 μm, furthermore, the solid electrolyte plate was fired at 1400° C. for 2 hours to form a fuel electrode.

Figure 2:
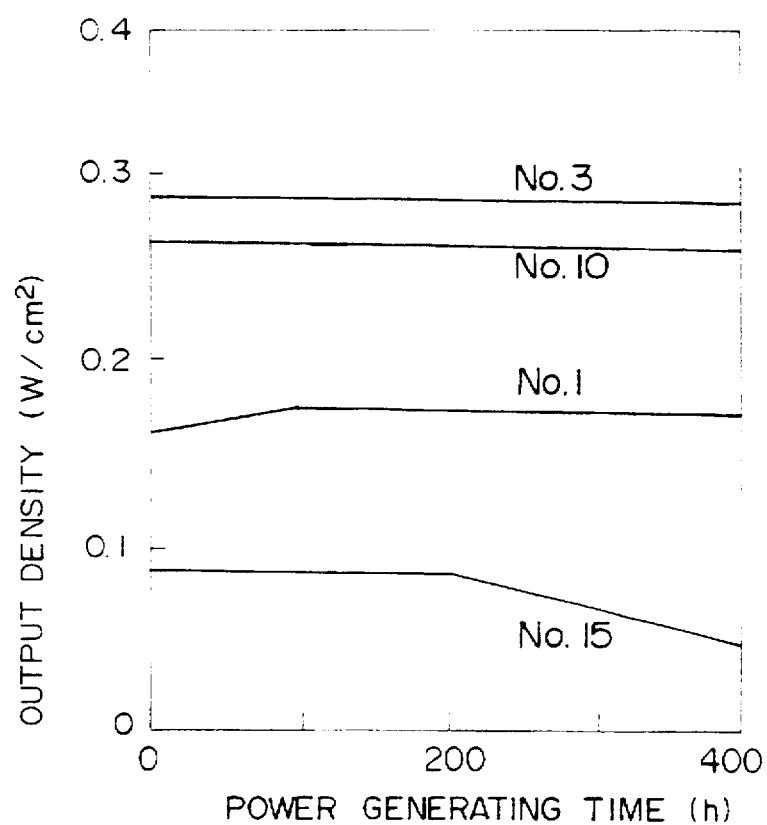

Then, a powder of La$_{0.9}$Sr$_{0.1}$MnO$_3$ was applied onto the other surface thereof maintaining a thickness of 30 μm, and the solid electrolyte plate was fired at 1200° C. for 2 hours to form an air electrode. The solid electrolyte plate was sandwiched by the separators, and an oxygen gas was supplied to the side of the air electrode and a hydrogen gas was supplied to the side of the fuel electrode in order to continuously generate electric power at 1000° C. for 400 hours and to measure the output density during the power generation. The results were as shown in FIG. 2. It was learned that the outputs were very small with the samples Nos. 1 and 15 that were outside the scope of the invention, but the samples Nos. 3 and 10 of the invention exhibited stable power generating characteristics.

(Example 7)

By using electrically conducting ceramics of Nos. 20, 25 of Example 3, separators were prepared in the same manner as described in Example 6, and by using these separators, fuel cells were prepared and the out put density during the power generation was measured in the same manner as described in Example 6. The results were as shown in FIG. 3. The samples of the present invention exhibited stable power generating characteristics.

We claim:

1. Electrically conducting ceramics having, as a chief crystalline phase, a perovskite crystalline phase containing at least one kind of rare earth element, Cr and Mg and further having, in addition to the chief crystalline phase, an oxide phase containing at least one kind of rare earth element, wherein said chief crystalline phase and said oxide phase contain at least La as a rare earth element and when the atomic ratios among the rare earth element, Mg and Cr in said chief crystalline phase are represented by the following formula (I), $$R:Mg:Cr=x:y:z \tag{I}$$

wherein R denotes a rare earth element, the atomic ratios among the rare earth element, Mg and Cr contained in the whole ceramics are represented by the following formula (II), $$R:Mg:Cr=(x+u):(y+v):z \tag{II}$$

wherein R is as defined above, x, y and z are the numbers as defined in the formula (I) above, and u and v are the numbers satisfying the following formulas, $$0.0001 \leq u/(x+y+z) \leq 0.20 \tag{a}$$

$$0.01 \leq (y+v)/(x+y+z) \leq 0.60 \tag{b}$$

$$0 \leq v \tag{c}$$

2. Electrically conducting ceramics according to claim 1, wherein said oxide phase is precipitated in the form of an oxide on triple points of the chief crystals.

3. Electrically conducting ceramics according to claim 1, wherein in the formula (II), v=0, and x, y and z are the numbers satisfying the following formula, $$0.01 \leq y/(x+y+z) \leq 0.20 \tag{d}$$

4. Electrically conducting ceramics according to claim 1, wherein in the formula (II), v>0, and x, y and z are the numbers satisfying the following formula, $$0.20 < (y+v)/(x+y+z) \leq 0.60 \tag{e}$$

5. Electrically conducting ceramics according to claim 1, wherein the rare earth elements (R) in said chief crystalline phase and in said oxide phase are all La.

6. Electrically conducting ceramics according to claim 1, wherein at least part of R in said chief crystalline phase is substituted by at least one of the elements selected from the group consisting of Ca, Ba and Sr.

7. Electrically conducting ceramics according to claim 1, wherein in the formula (I), x, y and z substantially satisfy the following formula, $$x = y + z \tag{f}$$

8. A process for the preparation of electrically conducting ceramics of claim 1, comprising mixing a powder of a perovskite composite oxide containing La, Cr and Mg and a powder of an oxide of a rare earth element, and molding the mixed powder into a predetermined shape followed by firing in an oxidizing atmosphere at 1300° to 1700° C.

9. A preparation process according to claim 8, wherein said powder of oxide of rare earth element and a powder of a Mg-containing oxide are mixed together.

10. A preparation process according to claim 8 or 9, wherein La in said powder of perovskite composite oxide is partly substituted by at least one element selected from the group consisting of Ca, Ba and Sr.

11. A preparation process according to claim 8, wherein use is made of a carbonate, a hydroxide or a nitrate of a rare earth element instead of said power of oxide of rare earth element.

12. A fuel cell in which collector members for electrically connecting the cells are composed of the electrically conducting ceramics of claim 1.

13. Electrically conducting ceramics having, as a chief crystalline phase, a perovskite crystalline phase containing at least one kind of rare earth element, Cr and Mg and further having, in addition to the chief crystalline phase, an oxide phase containing at least one kind rare earth element, and an oxide phase of Mg, wherein said chief crystalline phase and said oxide phase of rare earth element contain at least La as a rare earth element and when the atomic ratios among the rare earth element, Mg and Cr in said chief crystalline phase are represented by the following formula (I):

$$R:Mg:Cr = x:y:z \tag{I}$$

wherein R denotes a rare earth element, the atomic ratios among the rare earth element, Mg and Cr contained in the whole ceramics are represented by the following formula (II):

$$R:Mg:Cr = (x+u):(y+v):z \tag{II}$$

wherein R is defined above, x, y and z are the numbers as defined in the formula (I), and u and v are the numbers satisfying the following formulas:

$$0.0001 \leq u/(x+y+z) \leq 0.20 \tag{a}$$

$$0.20 < (y+v)/(x+y+z) \leq 0.60 \tag{b}$$

$$0 < v \tag{c}$$

* * * * *